United States Patent
Kim

(10) Patent No.: US 7,750,531 B2
(45) Date of Patent: Jul. 6, 2010

(54) DIRECT DRIVE MOTOR IN WASHING MACHINE

(75) Inventor: Hyeok Deok Kim, Changwon-si (KR)

(73) Assignee: LG Electronics Inc., Seoul (KR)

( * ) Notice: Subject to any disclaimer, the term of this patent is extended or adjusted under 35 U.S.C. 154(b) by 378 days.

(21) Appl. No.: 10/562,671

(22) PCT Filed: Nov. 8, 2005

(86) PCT No.: PCT/KR2005/003760

§ 371 (c)(1),
(2), (4) Date: Feb. 9, 2007

(87) PCT Pub. No.: WO2006/052071

PCT Pub. Date: May 18, 2006

(65) Prior Publication Data

US 2008/0122305 A1    May 29, 2008

(30) Foreign Application Priority Data

Nov. 11, 2004    (KR) .................... 10-2004-0091900

(51) Int. Cl.
*H02K 1/22* (2006.01)

(52) U.S. Cl. ..................... 310/268; 310/369
(58) Field of Classification Search ............ 310/156.12, 310/268, 344, 369; 68/12.01, 12.12, 14, 68/16, 140

See application file for complete search history.

(56) References Cited

U.S. PATENT DOCUMENTS

| | | | | |
|---|---|---|---|---|
| 2,485,623 A | * | 10/1949 | McNairy | 192/18 A |
| 5,809,809 A | * | 9/1998 | Neumann | 68/140 |
| 5,862,686 A | * | 1/1999 | Skrippek | 68/140 |
| 6,460,382 B1 | * | 10/2002 | Kim et al. | 68/140 |
| 6,564,594 B1 | * | 5/2003 | Ito et al. | 68/24 |
| 7,251,962 B2 | * | 8/2007 | Lim et al. | 68/23.3 |
| 7,305,857 B2 | * | 12/2007 | Kim et al. | 68/58 |
| 7,490,489 B2 | * | 2/2009 | Kim et al. | 68/3 R |
| 7,520,140 B2 | * | 4/2009 | DeLucia | 62/457.2 |
| 2005/0210604 A1 | | 9/2005 | Schmid et al. | |

FOREIGN PATENT DOCUMENTS

| JP | 2002-238227 A | 8/2002 |
|---|---|---|
| WO | WO-98/00902 A1 | 1/1998 |
| WO | WO-02/077352 A2 | 10/2002 |

* cited by examiner

*Primary Examiner*—Thanh-Tam T Le
(74) *Attorney, Agent, or Firm*—Birch, Stewart, Kolasch & Birch, LLP

(57) ABSTRACT

A direct drive motor in a washing machine includes a stator having a winding portion with coils wound thereon, a rotor having a sidewall, and a rear wall with a pass through hole at a center, and fastening pass through holes around the pass through hole, an annular washer in close contact with, and fixedly secured to, the rear wall of the rotor, the annular washer having fastening pass through holes in a surface thereof in correspondence to fastening pass through holes in the rear wall of the rotor, a connector of resin having a vibration mode different from the washing shaft, fixedly secured to an inner side of the rear wall of the rotor for supporting the washing shaft, the connector having fastening pass through holes in correspondence to the fastening pass through holes around the pass through hole, bolts passed through the fastening pass through holes in the connector, the rotor, and the washer, and nuts fastened to the bolts for holding the connector, the rotor, and the washer together.

20 Claims, 9 Drawing Sheets

[Fig. 1]
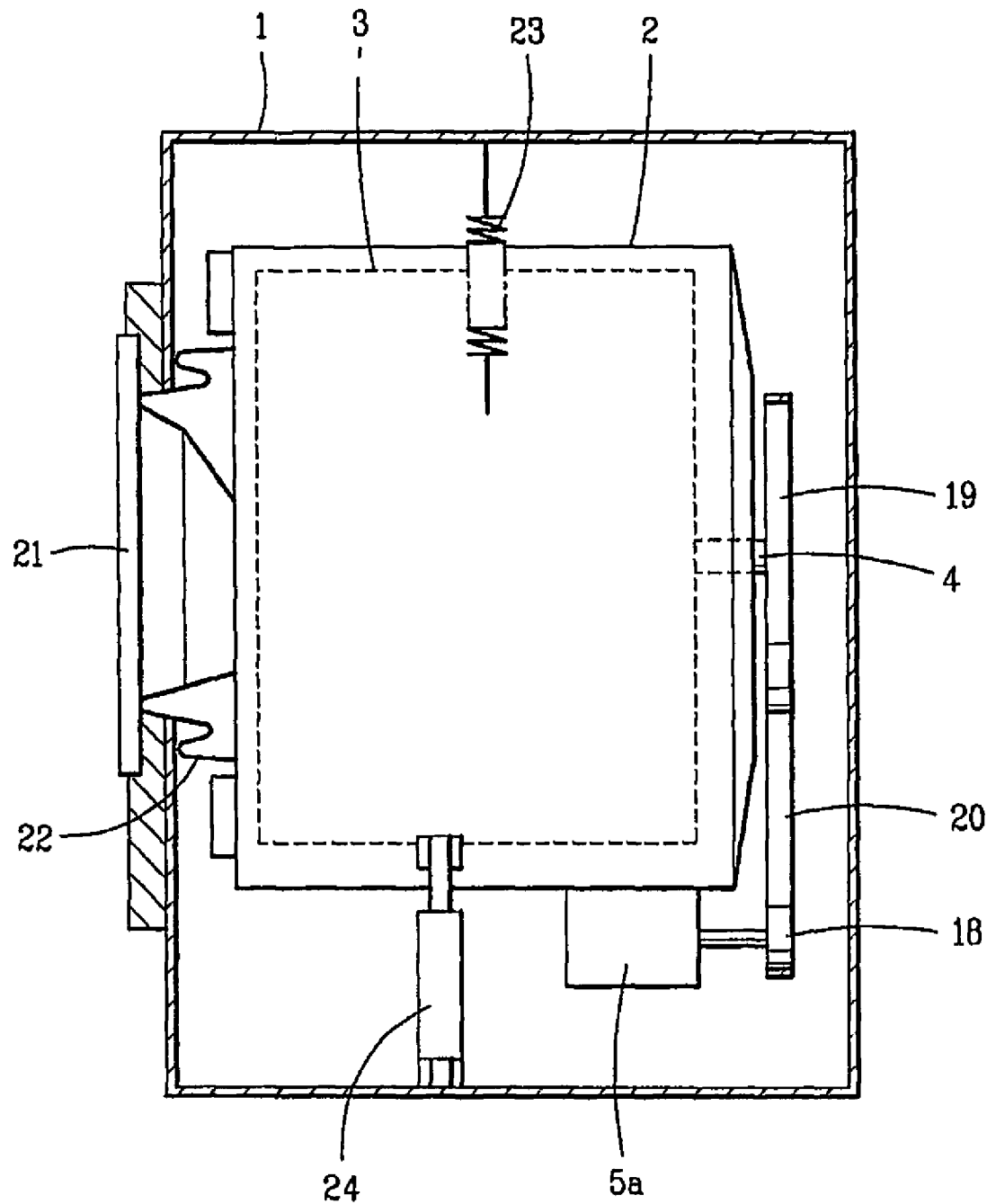

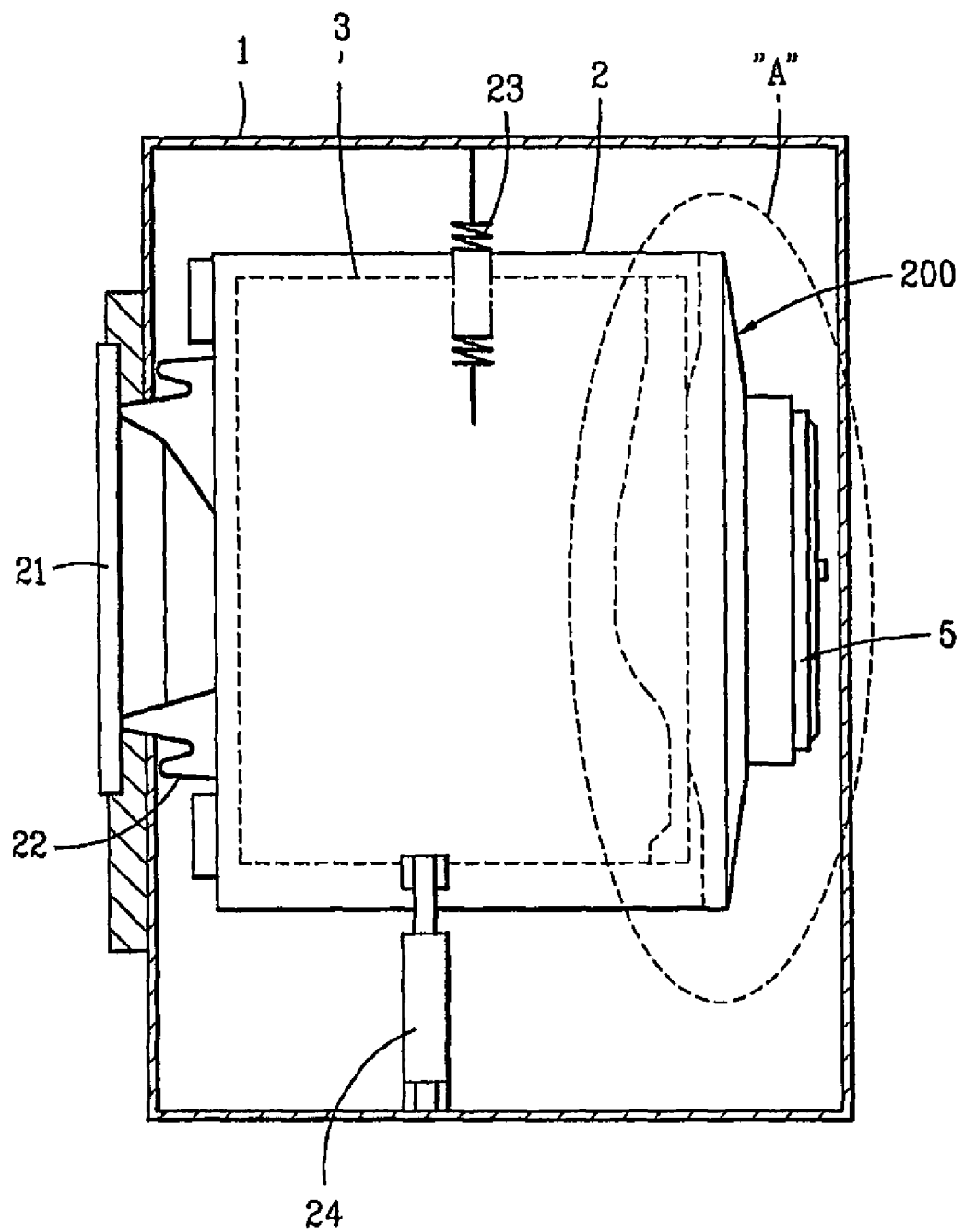
[Fig. 2]

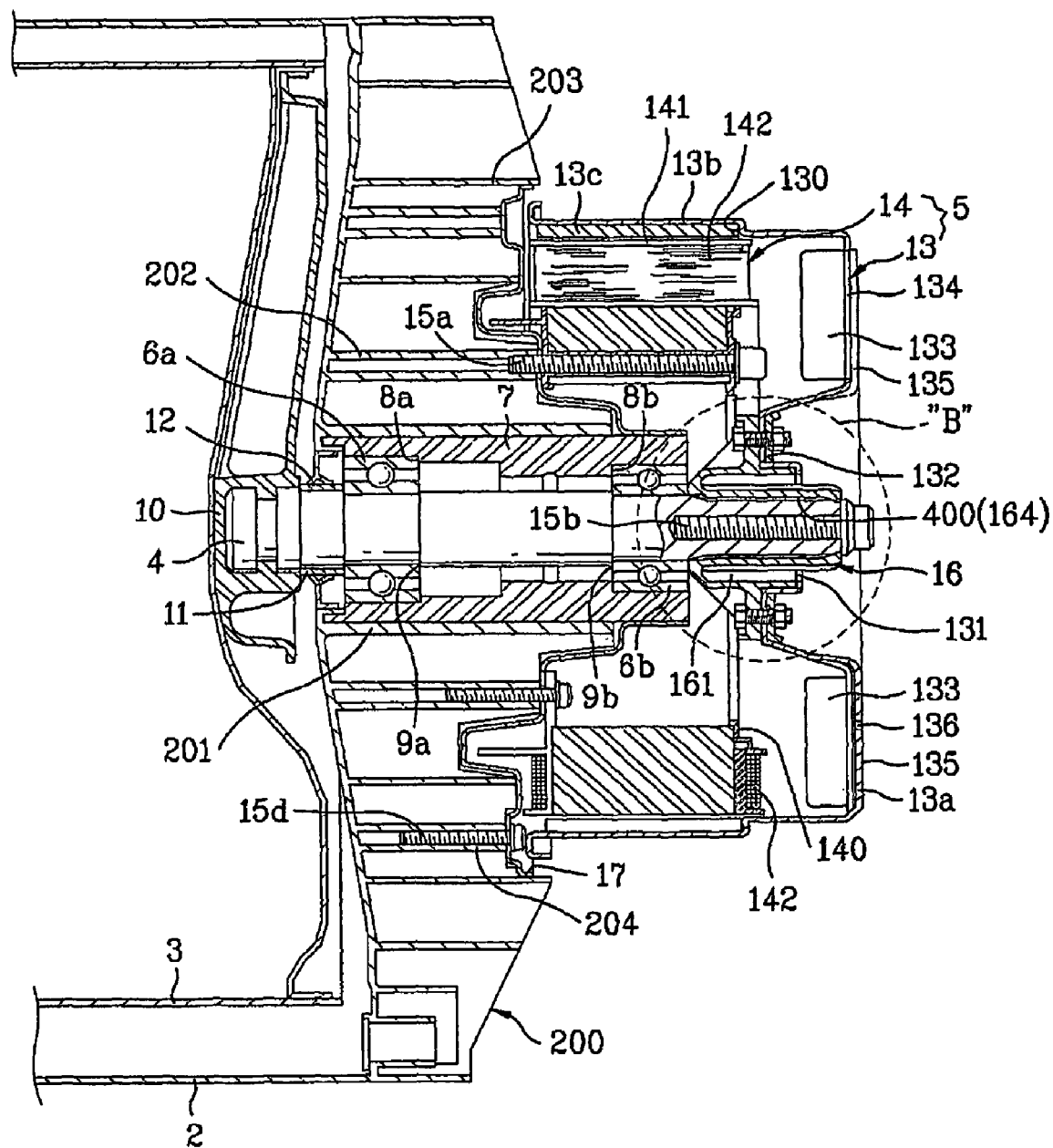
[Fig. 3]

[Fig. 4]
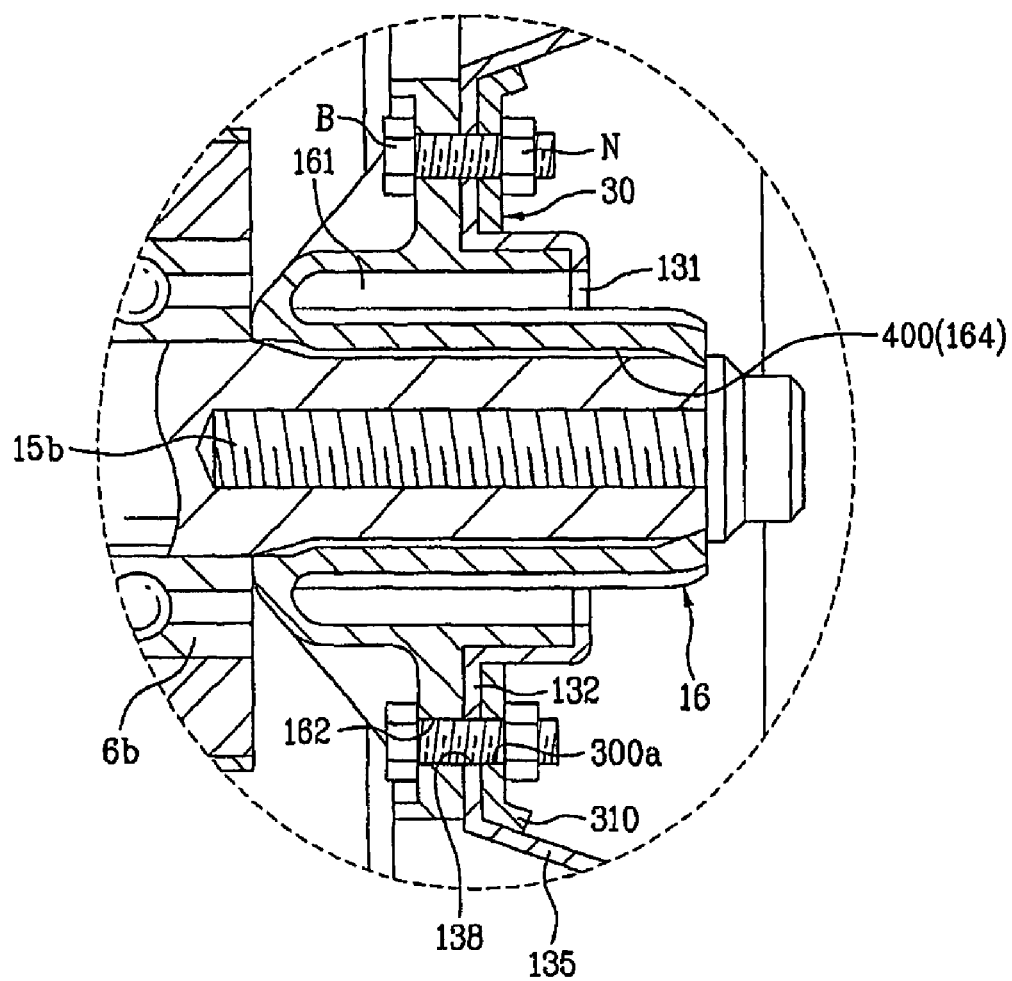
[Fig. 5]
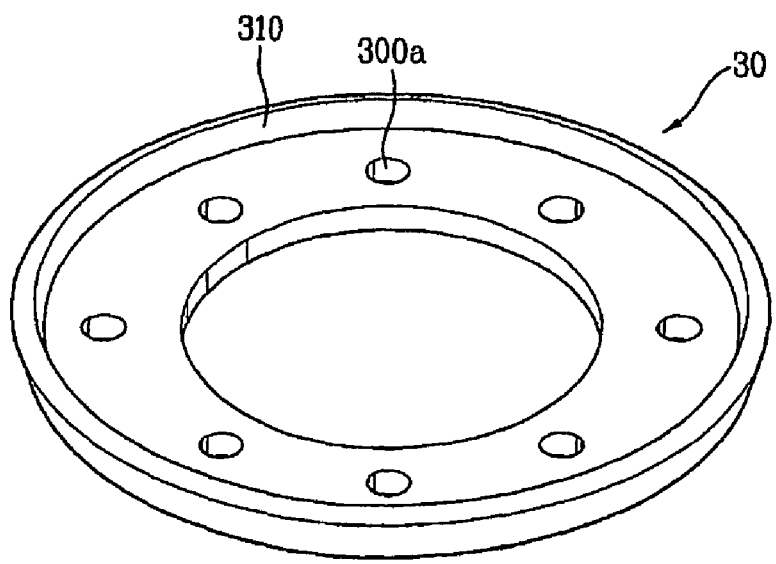

[Fig. 6]
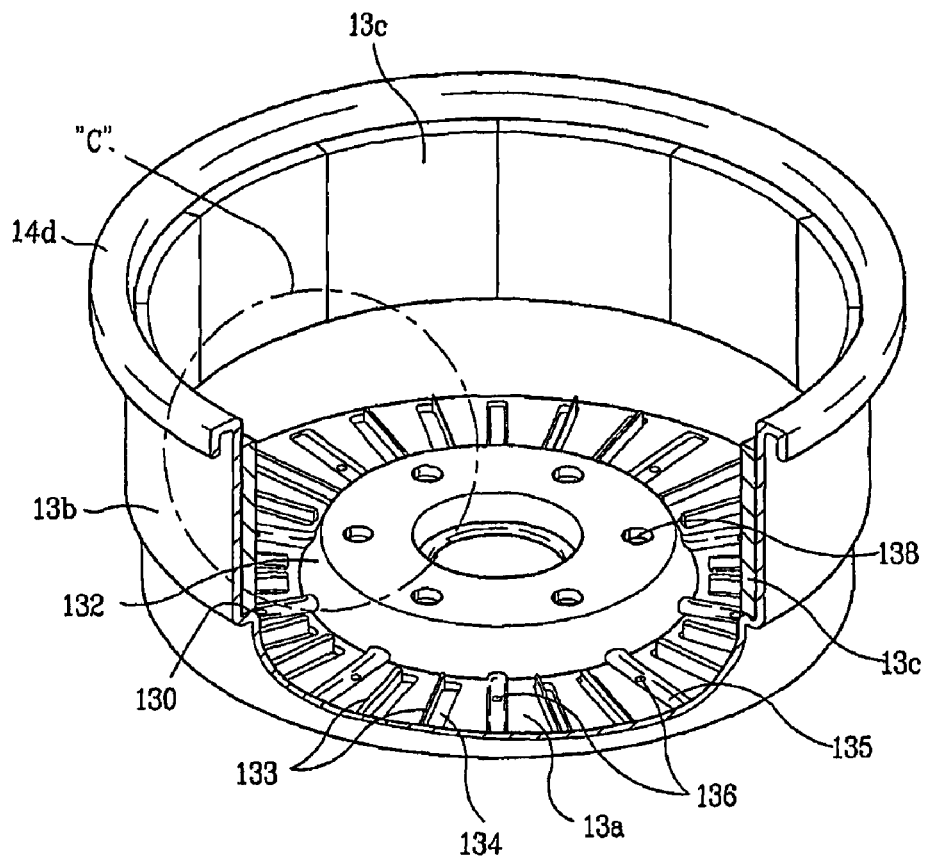
[Fig. 7]
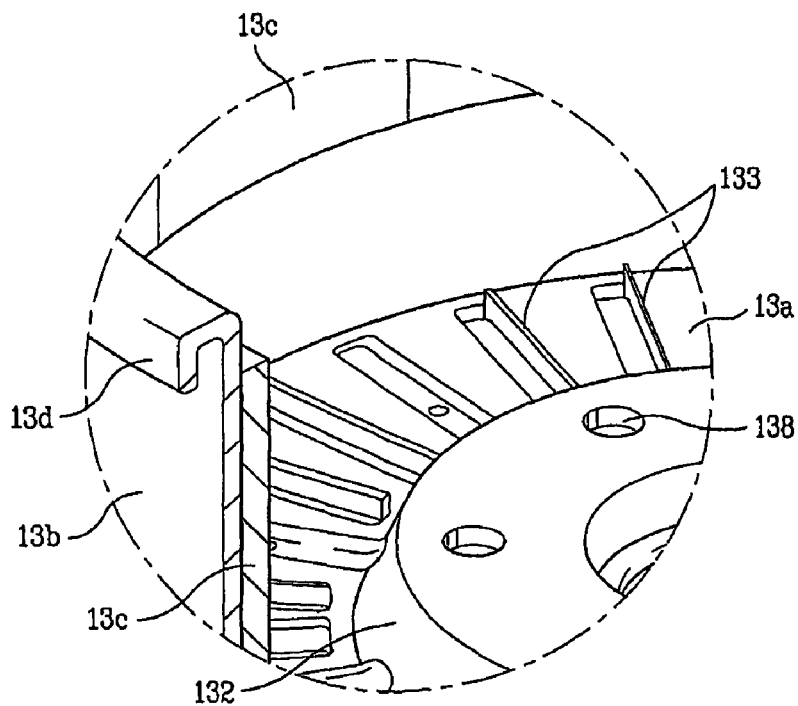

[Fig. 8]
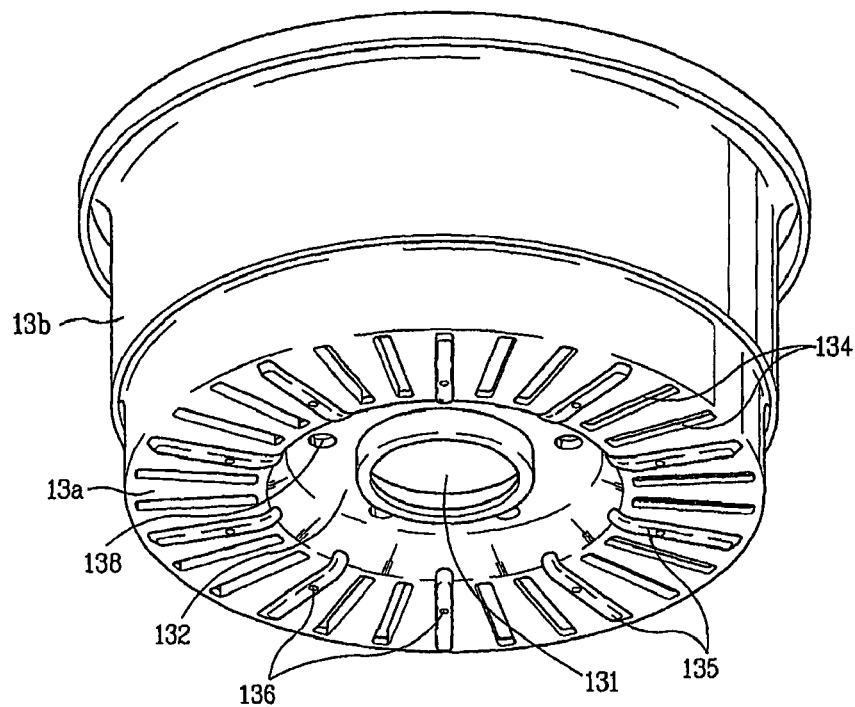
[Fig. 9]
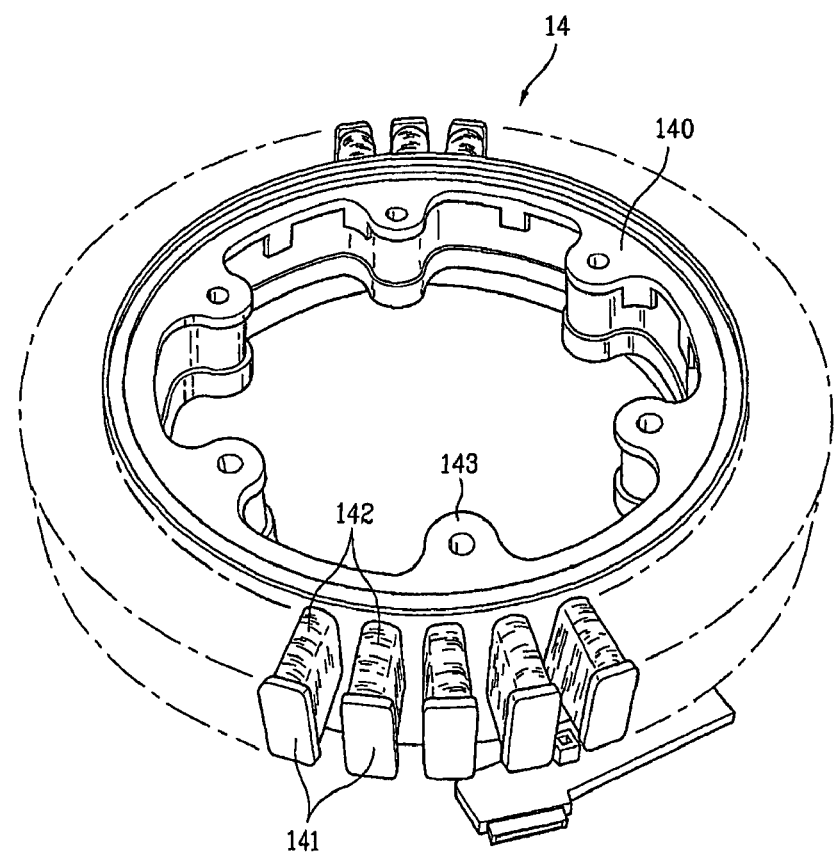

[Fig. 10]
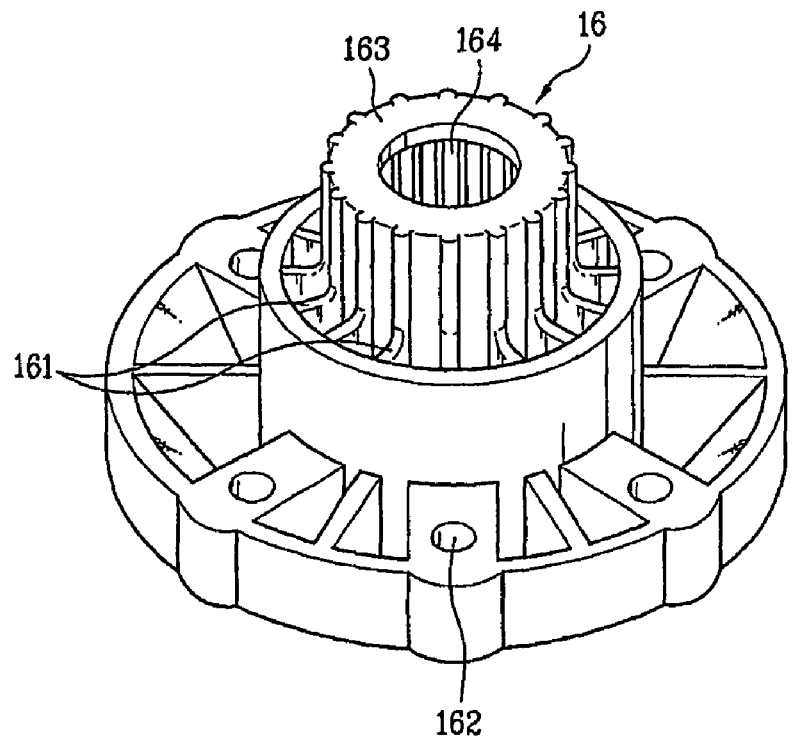
[Fig. 11]
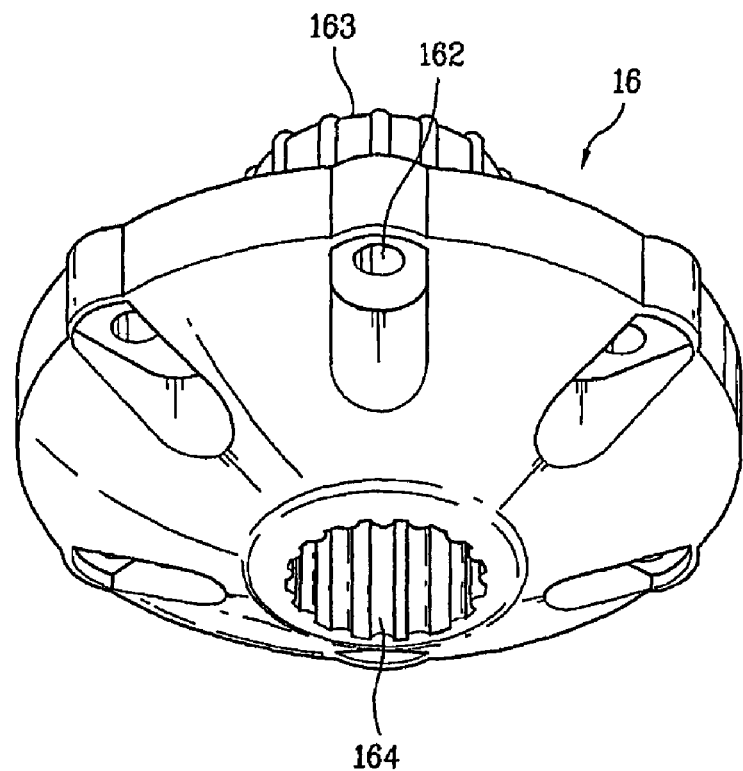

[Fig. 12]
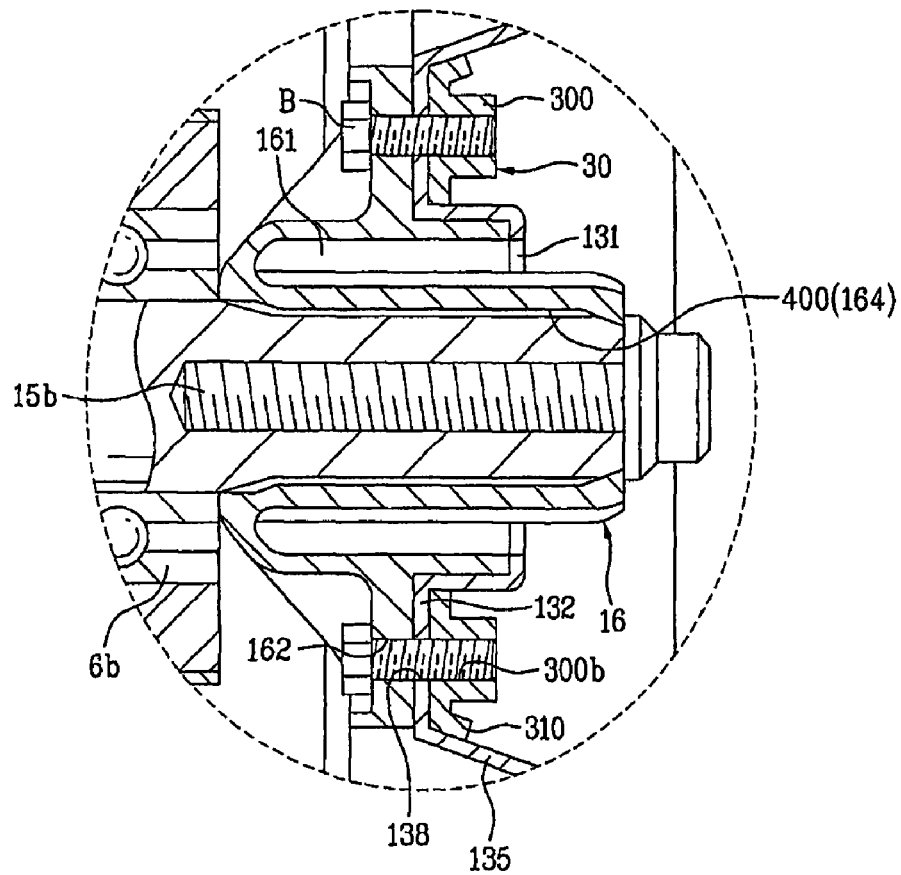
[Fig. 13]
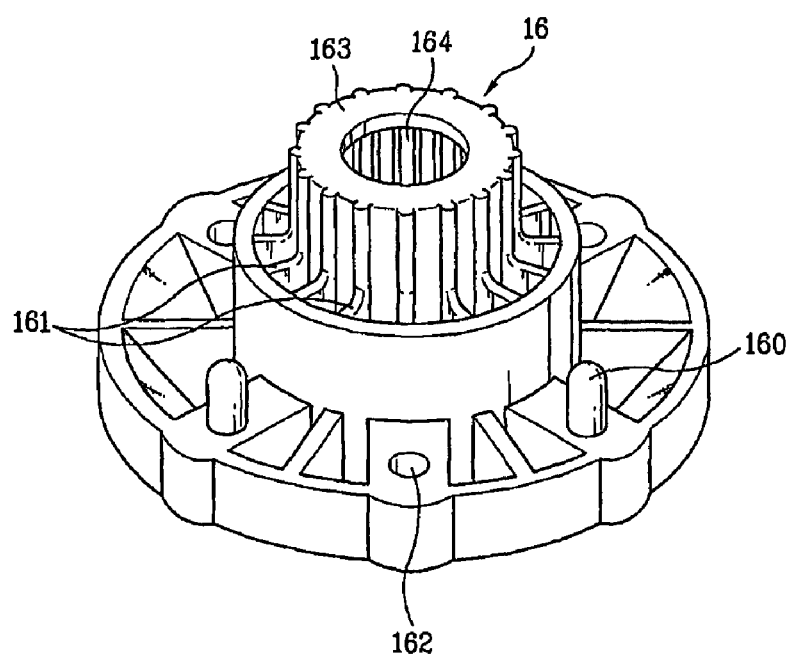

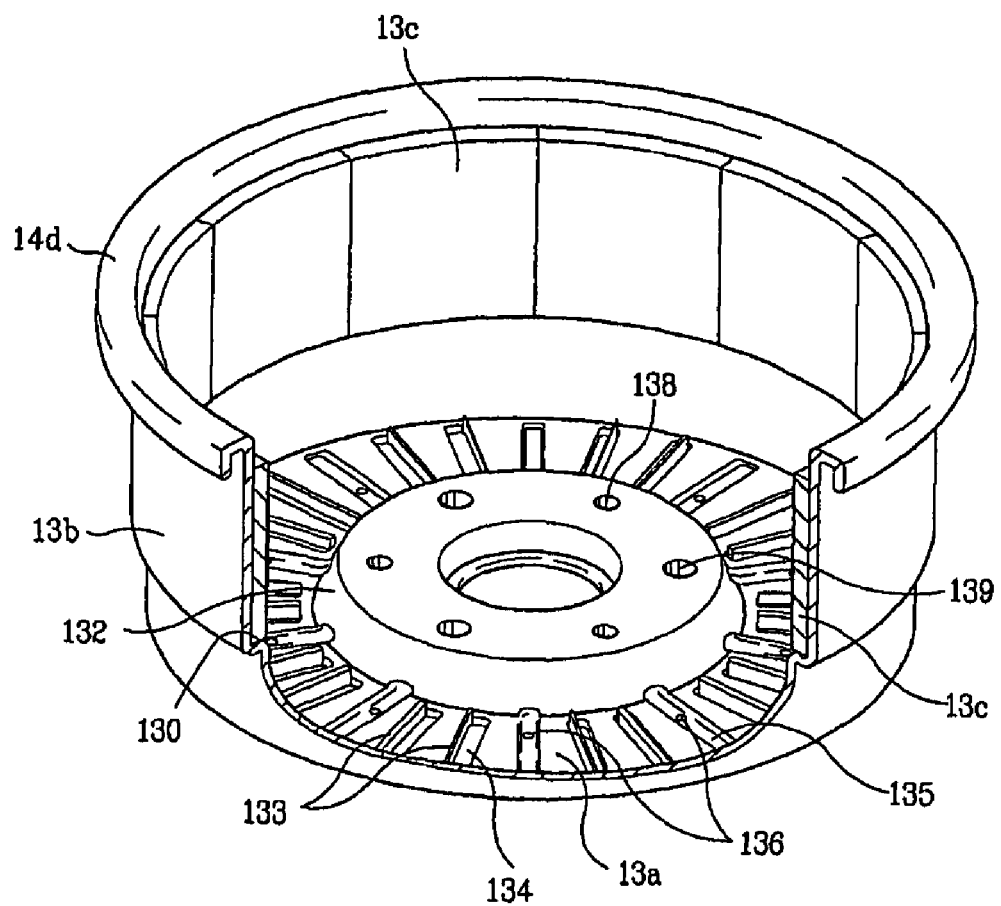
[Fig. 14]

DIRECT DRIVE MOTOR IN WASHING MACHINE

TECHNICAL FIELD

The present invention relates to washing machines, and more particularly, to a direct drive motor applicable to a drum type washing machine, and the like.

BACKGROUND ART

In general, a pulsator type washing machine performs washing under the control of a microcomputer for removing dirt from clothes, and beddings by using a softening action of detergent, friction of water circulation following rotation of a pulsator, and impact of the pulsator to laundry, after kind and amount of laundry is detected with a sensor, to set a washing method automatically accordingly, and washing water is supplied to a proper level according to the kind and amount of the laundry.

On the other hand, the drum type washing machine, washing laundry by using friction between laundry and drum rotated by driving force of a motor in a state the detergent, washing water, and the laundry are introduced into the drum, gives almost no damage to the laundry, causes no entangling of the laundry, and provides a washing effect of pounding and rubbing the laundry.

A related art drum type washing machine will be described briefly with reference to FIG. 1.

FIG. 1 illustrates a longitudinal section of a related art drum type washing machine, provided with a tub 2 in a cabinet 1, and a drum 3 rotatably mounted at a central portion of the tub 2.

Under the tub 2, there is a motor 5a having a motor pulley 18 coupled thereto through a shaft, and, in a rear of the drum 3, there is a drum shaft mounted thereon having a drum pulley 19 coupled thereto.

According to this, as the drum pulley 19 on the drum shaft and the motor pulley 18 coupled to the motor 5a are connected through a belt 20, a power transmission element, for transmission of driving force from the motor to the drum 3 through the belt 20.

Mounted on a front of the cabinet 1, there is a door 21, with a gasket 2 mounted between the door 21 and a tub 2.

In the meantime, between an underside of an upper portion of the cabinet 1 and an upper side of an outside circumference of the tub 2, there are hanging springs 23 for suspending the tub, and between a bottom of the cabinet 1 and a lower side of the outside circumference of the tub 2, there are dampers 24 for attenuating vibration of the tub 2 taking place at the time of spinning.

However, the related art washing machine has the following drawback since the related are washing machine has a structure in which the driving force is transmitted from the motor 5a to the drum 3 through the motor pulley 18, the drum pulley 19, and the belt 20 connecting the motor pulley 18 and the drum pulley 19.

First of all, because the driving force is transmitted to the drum 3, not directly, but through the belt 20 wound on the motor pulley 18 and the drum pulley 19, an energy loss takes place in a course of driving force transmission.

Moreover, because the driving force is transmitted to the drum 3, not directly, but through many components, such as the motor pulley 18, the drum pulley 19, the belt 20, and so on, much noise is generated in the power transmission.

The many components, such as the motor pulley 18, the drum pulley 19, the belt 20, and so on, required for transmission of the driving force of the motor 5a to the drum 3 cause to increase an assembly man-hours of the product.

Moreover, the many components required for transmission of the driving force of the motor 5a to the drum 3 increase a number and frequency of faults.

In short, the indirect transmission of the driving force from the motor 5a to the drum 3 by using the motor pulley, the drum pulley, and the belt is liable to cause trouble and noise, has many energy waste factors, and impairs washing capability.

Along with this, the tub 2 of stainless steel of the related art drum type washing machine costs high, has a poor processability, and is heavy.

In the meantime, instead of the indirect transmission of the driving force from the motor to the drum by using the belt and pulleys, though a direct drive drum type washing machine system has been introduced, the system has a drawback in that a stator directly secured to a rear wall of the tub fails to maintain concentricity of the stator due to damage or deformation of a fastening portion caused by vibration of the motor.

Moreover, in order to solve above problem, in a case a bearing housing is fabricated separate from the tub, not only assembly is difficult, but also the assembly occupies a large space as an entire bearing housing projects from the tub. In a case the bearing housing is fastened with screws or bolts, since the bearing housing is supported, not entirely, but only partially at one side thereof, the fastening is susceptible to vibration. Moreover, since a complicate water protection structure is required not only for the bearing itself, but also between the tub and the bearing, the structure has drawback in fabrication.

Together with this, the bearing housing is required to have an inner collar and an outer collar which are separate components for supporting the bearing mounted therein, and fabrication of the rotor is very difficult because of individual permanent magnets, steel plate, and a back yoke at a back side of the steel plate.

In the meantime, in order to solve the problem, a structure of the driving unit is introduced, in which the motor has a steel plate rotor having a back yoke provided separately, and the bearing housing not projected to an outside of the tub.

However, since the structure has a rotor with an axial projection from a rear wall of the rotor, and thread on an inside circumferential surface of the projection, for fastening a connector to the thread in the projection with a screw, the structure has a complicate rotor fabrication process and a poor processability, requiring to form the projection and the thread on the inside circumferential surface of the projection at the time of processing the rotor, and remove burrs therefrom.

DISCLOSURE OF INVENTION

Technical Problem

An object of the present invention is to provide a direct drive motor in a washing machine, in which a structure of a driving unit in a drum type washing machine is improved for enhancing processability, and rigidity of the tub to reduce vibration taken place at the time of rotation of the rotor.

Technical Solution

The object of the present invention can be achieved by providing a direct drive motor in a washing machine including a stator 14 having a winding portion with coils wound thereon, a rotor having a sidewall 13b, and a rear wall 13a with a pass through hole 131 at a center, an annular washer in close contact with, and fixedly secured to, the rear wall 13a of the rotor 13, a connector of resin having a vibration mode different from the washing shaft, fixedly secured to the rear wall of the rotor for supporting the washing shaft, coupling means for coupling the connector 16, the rotor 13, and the washer 30 together.

Preferably, the rotor 13 is constructed of steel plate by pressing, to form the side wall 13b and the rear wall 13a as one body.

The rotor 13 has fastening pass through holes 138 around the pass through hole 131, the washer 30 has fastening pass through holes 300a on a surface thereof in correspondence to the fastening pass through holes 138 in the rear wall of the rotor, the connector has fastening pass through holes 162 in correspondence to the fastening pass through holes 138 in the rotor 13, and the coupling means includes bolts 'B' inserted through the fastening pass through holes 162, 138, and 300a, and nuts 'N' fastened to threads on the bolts 'B' for holding the connector 16, rotor, and washer.

Preferably, the annular washer 30 further includes positioning holes in which the positioning projections 160 on the connector 16 are placed respectively, separate from the fastening pass through holes 300a, and the positioning holes are formed along a circumferential direction of an imaginary circle having a diameter different from an imaginary circle connecting centers of the fastening pass through holes 300a in the annular washer 30.

Preferably, the rotor 13 further includes a hub 132 projected from the rear wall toward the washing shaft for reinforcing strength, and providing a seating surface, and the annular washer 30 includes a bent portion 310 on a circumference having a shape in conformity with a shape of a bent portion of the hub 132.

In the meantime, preferably, the annular washer 30 is in close contact with, and fixedly secured to an outer side of the rear wall 13a of the rotor 13, and the connector 16 is mounted on an inner side of the rear wall 13a of the rotor 13.

In another aspect of the present invention, a direct drive motor in a washing machine includes a stator 14 having a winding portion with coils wound thereon, a rotor having a sidewall 13b, and a rear wall 13a with a pass through hole 131 at a center, and fastening pass through holes 138 around the pass through hole 131, an annular washer 30 in close contact with, and fixedly secured to, the rear wall 13a of the rotor 13, the annular washer 30 having fastening bosses 300 projected from a surface thereof toward a washing shaft in correspondence to fastening pass through holes 138 in the rear wall of the rotor, each of the fastening bosses 300 having a fastening hole 300b with a thread on an inside circumference, a connector of resin having a vibration mode different from the washing shaft, fixedly secured to the rear wall of the rotor with bolts 'B' passed through the fastening pass through holes 138 in the rotor, and fastened to the fastening bosses 300 on the annular washer 30.

In another aspect of the present invention, a direct drive motor in a washing machine includes a stator 14 having a winding portion with coils wound thereon, a rotor having a sidewall 13b, and a rear wall 13a with a pass through hole 131 at a center, and fastening pass through holes 138 around the pass through hole 131, an annular washer 30 in close contact with, and fixedly secured to, the rear wall 13a of the rotor 13, the annular washer 30 having fastening pass through holes 300a in a surface thereof in correspondence to fastening pass through holes 138 in the rear wall of the rotor, a connector 16 of resin having a vibration mode different from the washing shaft, fixedly secured to an inner side of the rear wall of the rotor for supporting the washing shaft, the connector having fastening pass through holes 162 in correspondence to the fastening pass through holes 138 around the pass through hole 131, bolts 'B' passed through the fastening pass through holes in the connector 16, the rotor 13, and the washer 30, and nuts 'N' fastened to threads on the bolts 'B' for holding the connector 16, the rotor, and the washer together.

ADVANTAGEOUS EFFECTS

The direct drive motor in a washing machine of the present invention has the following advantages.

The drum type washing machine has less noise, fault, and power loss owing to the direct drive motor.

Moreover, the present invention improves workability at the time of fabrication of the rotor, and reduces vibration from the rotor by means of the washer provided on the inner or outer side of the rear wall of the rotor.

Furthermore, the bearing housing of metal enables to apply to a product having a drying function as the bearing housing of metal shows no thermal deformation.

Along with this, the rotor of steel plate enables pressing with good processability to require a shorter fabrication time period with productivity.

The magnet seating surface of the rotor improves workability at the time of mounting the magnets, and the drain holes, the cooling fins and the vents therein prevent the motor from overheating, to improve reliability, and a lifetime of the motor.

The connector having a vibration mode different from the rotor permits to reduce vibration from the rotor to the shaft, and the supporter supports and maintains concentricity of the stator, effectively.

BRIEF DESCRIPTION OF THE DRAWINGS

The accompanying drawings, which are included to provide a further understanding of the invention, illustrate embodiment(s) of the invention and together with the description serve to explain the principle of the invention. In the drawings;

FIG. 1 illustrates a longitudinal section of a related art drum type washing machine;

FIG. 2 illustrates a longitudinal section of a drum type washing machine in accordance with a preferred embodiment of the present invention;

FIG. 3 illustrates a longitudinal section of "A" part in FIG. 2 showing a driving unit of the drum type washing machine in accordance with a preferred embodiment of the present invention;

FIG. 4 illustrates an enlarged view of "B" part in FIG. 3;

FIG. 5 illustrates a perspective view of an annular washer;

FIG. 6 illustrates a perspective view of the rotor in FIG. 2, with a partial cut away view;

FIG. 7 illustrates an enlarged view of "C" part in FIG. 6;

FIG. 8 illustrates a bottom perspective view of FIG. 6;

FIG. 9 illustrates a perspective view of the stator in FIG. 2;

FIG. 10 illustrates a perspective view of the connector in FIG. 2;

FIG. 11 illustrates a bottom perspective view of FIG. 10;

FIG. 12 illustrates a longitudinal section of a driving unit in a drum type washing machine in accordance with another preferred embodiment of the present invention;

FIGS. 13 and 14 illustrate perspective views of a connector and a rotor in accordance with another preferred embodiment of the present invention, respectively.

BEST MODE FOR CARRYING OUT THE INVENTION

Reference will now be made in detail to the preferred embodiments of the present invention, examples of which are illustrated in the accompanying drawings FIGS. 2 to 11.

FIG. 2 illustrates a longitudinal section of a drum type washing machine in accordance with a preferred embodiment of the present invention, and FIG. 3 illustrates a longitudinal section of "A" part in FIG. 2 showing an enlarged view of a driving unit of the drum type washing machine in accordance with a preferred embodiment of the present invention.

FIG. 4 illustrates an enlarged view of "B" part in FIG. 3, and FIG. 5 illustrates a perspective view of an annular washer.

FIG. 6 illustrates a perspective view of the rotor in FIG. 2, and FIG. 7 illustrates a perspective view of "C" part in FIG. 6, and FIG. 8 illustrates a bottom perspective view of FIG. 6.

FIG. 9 illustrates a perspective view of the stator in FIG. 2, FIG. 10 illustrates a perspective view of the connector in FIG. 2, and FIG. 11 illustrates a bottom perspective view of FIG. 10.

According to the present invention, in a drum type washing machine including a tub 2 in a cabinet 1, a drum 3 in the tub 2, a shaft 4 connected to the drum 3 for transmission of a driving power from a motor 5 to the drum 3, and bearings on an outside circumferential surface of opposite ends of the shaft 4, the tub 2 is formed of plastic, and a bearing housing 7 of metal is provided to a center of a rear wall 200 of the tub 2 for supporting the bearings on the outside circumferential surface of opposite ends of the shaft 4.

The metal bearing housing 7 is inserted in injection molding of the plastic tub 2 such that the bearing housing 7 becomes one body with the tub 2 at the rear wall thereof.

It is preferable that the bearing housing 7 is formed of aluminum.

In the meantime, the bearing housing 7 has steps 8a and 8b on an inside circumferential surface of the bearing housing 7 for supporting a front bearing 6a and a rear bearing 6b, and preventing the bearings from falling off the bearing housing 7, respectively.

Of the steps 8a and 8b on an inside circumferential surface of the bearing housing 7, the step 8a at a front side has a ㄱ shape to form a structure for supporting a rear end of the front bearing 6a, and the step 8b at the rear side has a ㄴ shape to form a structure for supporting a front end of the rear bearing 6b.

On an outside circumferential surface of the shaft 4 in the bearing housing 7 for transmission of a driving power from the motor 5 to the drum 3, there are positioning steps 9a and 9b at a front side and a rear side thereof, for positioning the front bearing 6a and the rear bearing 6a on the shaft 4.

The shaft 4 has a front end fixedly secured to a spider 10 on the rear wall of the drum 3, a brass bushing 11 press fit on a region of the shaft 4 starting from an exposed portion of the shaft 4 in rear of the spider 10 to the front bearing 6a for preventing the shaft 4 from rusting, and a sealing member 12 on an outer side of the bushing 11 for preventing infiltration of water.

In the meantime, there are a rotor 13 of the direct drive motor 5 coupled to a center of a rear end portion of the shaft 4, and a stator 14 of the direct drive motor 5 on an inner side of the rotor 13 secured to the rear wall 200 of the tub 2.

Referring to FIGS. 6 to 8, the rotor 13, constructed of steel plate, includes a sidewall 13b extended forward from a circumference of a rear wall 13a, having a bent portion formed along a circumferential direction, with a seating surface 130 for supporting magnets 13c mounted on an inside circumferential surface of the side wall 13a, and a hub 132 at a center of the rear wall 13a, with pass through holes 131 formed therein for pass through of thread portions of fastening members 15b, such as bolts, to couple the rotor 13 to the shaft 4.

The hub 132 is bent toward a direction of the washing shaft for reinforcing rigidity of the rotor, and providing a seating surface of a connector.

In the meantime, there are a plurality of fastening pass through holes 138 around the pass through hole 131 in the rotor 13.

On an outer side of the rear wall 13a of the rotor 13, there is an annular washer 30.

The annular washer 30 has a plurality of fastening pass through holes 300a in correspondence to the fastening pass through holes 138 in the rear wall of the rotor.

The washer has a bent portion 310 at a circumference with a shape in conformity with the hub 132.

In the meantime, the plurality of pass through holes 300a in the annular washer 30 may be formed in at least two lines along a circumferential direction as imaginary circles of centers of the fastening pass through holes 300a form diameters different from each other.

FIG. 4 illustrates a section showing a connector 16, the hub 132 of the rotor, and the annular washer 30 fastened together with a plurality of bolts 'B' passed therethrough and engaged with nuts 'N'. The fastening pass through holes where the bolts 'B' pass through require no threads.

It is preferable that the rotor 13 is formed by pressing.

Around the hub 132 of the rotor 13, there are a plurality of cooling fins 133 formed in a radial direction for blowing air toward the stator 14 when the rotor 13 is rotated to cool down heat from the stator 14, each with a predetermined length in the radial direction.

The cooling fins 133 are formed by lancing, such that the cooling fins 133 are bent 90 from the rear wall toward opened portion, and pass through hole 134 formed by the lancing serve as vents.

Along with this, there are embossed portions 135 between adjacent cooling fins 133 on the rear wall 13a of the rotor 13 for reinforcing the rotor 13, each with a drain hole 136 for draining water.

Around the pass through hole 131 in the hub 132 of the rotor 13, there are a plurality of fastening pass through holes 138 formed in a circumferential direction for fastening the connector 16 coupled to an outside circumferential surface of the rear end of the shaft 4 exposed on a rear side of the rear bearing 6b with a serration. The fastening pass through holes 138 may be formed in at least two lines along the circumferential direction as imaginary circles of centers of the fastening pass through holes 162 form diameters different from each other.

The connector 16 is formed of resin having a vibration mode different from the rotor 13 of steel plate, and also serves as a bushing for the rotor.

In the meantime, referring to FIGS. 3, 10, and 11, the connector 16 has fastening pass through holes 162 in a circumferential direction of a periphery in correspondence to the fastening pass through holes 138 in the hub 132 of the rotor. Alikely, the fastening pass through holes 162 may be formed in at least two lines along the circumferential direction as imaginary circles of centers of the fastening pass through holes 162 form diameters different from each other.

The connector 16 also has a serration 164 on an inside circumferential surface of the hub 163 in conformity with the serration on the rear end of the shaft 4, and may have a reinforcing ribs 161 on an outer side of hub 163 of the connector 16 for reinforcing the hub 163.

In the meantime, on the rear wall 200 of the tub 2, there is a hub 201 for inserting the bearing housing 7 therein in injection molding of the tub, and on an outer side of the hub 201, there are fastening bosses 202 formed in a circumferential direction at regular intervals for fixedly securing the stator 14 to the rear wall 200 of the tub 2 with fastening members 15a.

Between the rear wall 200 of the tub 2 and the stator 14, there is a supporter 17 having a shape almost the same with a contour of the rear wall 200 of the tub for securing to the rear wall 200 of the tub at the time of mounting the stator 14, for supporting the stator 14, and maintaining concentricity of the stator 14.

The supporter 17 has an outer side in close contact with an inner side of a rib 203 on the rear wall 200 of the tub, and an inner side in close contact with an outside circumference of a rear end of the bearing housing 7, not surrounded by, but exposed from the hub 201 at the center of the rear wall 200 of the tub.

The supporter 17 and the rear wall 200 of the tub are coupled together with a plurality of fastening members 15d passed through an outside circumferential surface of the supporter 17, and fastened to the hub 204 on the rear wall of the tub. In order to secure the stator 14 to the supporter 17, other fastening members 15a are used on an inner side of the fastening members 15a.

In the meantime, referring to FIGS. 3 and 9, the stator 14 of the motor 5 includes a ring shaped frame 140, and a coil 142 wound on a winding portion on an outer side of the frame 140, with fastening ribs 143 formed on an inner side of the frame 140 as one body for securing the stator 14 to the rear wall 200 of the tub.

The operation of the drum type washing machine of the present invention will be described.

When the rotor 13 starts to rotate as a current flows to the coils 142 on the stator 14 in a sequence under the control of a motor driving controller (not shown), the shaft 4 coupled to the connector 16 which is coupled to the rotor, with the serration rotates, to transmit power to the rotor 13 through the shaft 4, accordingly.

In the meantime, the drum type washing machine having the driving unit of the present invention applied thereto has the following characteristics.

The formation of the tub 2 of a plastic having a good heat resistance is light and has a good processability as the tub 2 is injection molded.

The formation of the bearing housing 7 of a metal, such as an aluminum alloy, enables to apply even to a drum type washing machine having a drying course as the bearing housing 7 has no deformation at a high temperature.

The bearing housing of metal inserted in the hub 200 of the rear wall 200 of the tub at the time of injection molding of the tub 2 of plastic so as to be one unit with the tub 2 enables to omit a separate step of mounting the bearing housing 7 on the rear wall of the tub 200.

Accordingly, an assembly process can be simplified further, to reduce man-hours required for assembly.

The ⌐ shaped step 8a at the front side of the inside circumferential surface of the bearing housing 7 and the ⌐ shaped step at the rear side thereof enable to support the rear end of the front bearing 6a, and the front end of the rear bearing 6b.

That is, the steps 8a, and 8b on opposite sides of the inside circumferential surface of the bearing housing of metal can support the bearings 6a, and 6b without falling off the bearing housing 7.

Moreover, the positioning steps 9a, and 9b on a front, and a rear outside circumferential surface of the shaft 4 mounted in the bearing housing 7 for power transmission from the motor S to the drum 3 permits an easy positioning of the front bearing 6a and the rear bearing 6b at the shaft 4.

In the meantime, the securing of the front end of the shaft 4 to a spider 10 on the rear wall of the drum 3, and the brass bushing 11 press fit on a region of the shaft 4 starting from an exposed portion of the shaft 4 in rear of the spider 10 to the front bearing 6a for preventing the shaft 4 from rusting permit to prevent the shaft 4 from rusting.

The sealing member 12 on an outer side of the bushing 11 prevents infiltration of water toward the bearing.

The rotor 13 of the direct drive motor 5 is coupled to a center of a rear end portion of the shaft 4, and the stator 14 is on an inner side of the rotor 13, wherein the rotor 13 has a sidewall 13b extended forward from a circumference of a rear wall 13a, having a bent portion formed along a circumferential direction, with a seating surface 130 for supporting magnets 13c mounted on an inside circumferential surface of the side wall 13a, thereby permitting an easy fabrication of the rotor.

The hub 132 at a center of the rear wall 13a of the rotor 13, with pass through holes 131 formed therein enables to pass thread portions of fastening members 15b, such as bolts, to couple the rotor 13 to the shaft 4, and the plurality of cooling fins 133 formed each with a predetermined length in a radial direction blow air toward the stator 14 when the rotor 13 is rotated to cool down heat from the stator 14.

The cooling fins 133 are formed by lancing in a direction of an opened portion of the rotor 13, and the pass through holes 134 formed by the lancing serve as vents.

The rotor 13 of steel plate formed by pressing reduces a time period required for fabrication of the rotor 13 significantly, thereby improving productivity.

Along with this, the embossed portions 135 between every adjacent cooling fins 133 on the rear wall 13a of the rotor 13 improve an overall rigidity of the rotor 13, and the drain hole 136 in the embossed portion 135 enables draining of water.

The fastening pass through holes 138, and the positioning holes 139 for positioning the connector 16 around the pass through hole 131 in the hub 132 of the rotor 13 permit easy mounting of the connector 16, coupled to the outside circumferential surface of the rear end of the shaft 4 exposed in rear of the rear bearing 6b with serration, to the rotor.

That is, once the positioning projections 160 of the connector 16 are placed in the positioning holes 139, the fastening pass through holes 138 and 162 are aligned automatically, to enable easy assembly of the connector 16 and the rotor 13 by passing fastening bolts through the fastening pass through holes 138 and 162 of the rotor 13 and the connector 16 respectively and fastening the fastening bolts in the fastening bosses 300 of the washer 30.

The washer 30 in close contact with the rear wall of the rotor enhances a rigidity of the rotor, to reduce noise from the rotor.

The connector 16, an injection molding of resin, with a vibration mode different from the rotor 13 of steel plate attenuates the vibration from the rotor 13 before transmission of the vibration to the shaft 4.

In the meantime, the engagement of the serration 164 on the inside circumferential surface of the hub 163 of the connector 16 with the serration 400 on the rear end portion of the shaft 4 permits transmission of a rotation force from the rotor 13 to the shaft 4 through the connector 16 as it is.

The reinforcing ribs 161 on the outer side of the hub 163 of the connector 16 reinforce strength of the connector.

The fastening bosses 202 on an outer side of the hub 201 in a circumferential direction at regular intervals permits to secure the stator 14 to the rear wall 200 of the tub 2. The supporter 17 between the rear wall 200 of the tub 2 and the stator 14, having a shape almost the same with a contour of the rear wall 200 of the tub for securing to the rear wall 200 of the tub at the time of mounting the stator 14 supports, and maintains concentricity of the stator 14.

That is, once the supporter 17 is fastened to the supporter fastening bosses 204 on the rear wall 200 of the tub with the fastening members 15a, a front side of the supporter 17 is in close contact with the inner side of the rib 203 on the rear wall 200 of the tub, and the inner side of the supporter 17 is in close contact with the outside circumference of the rear end of the bearing housing 7, not surrounded by, but exposed from the hub 201 at the center of the rear wall 200 of the tub, to support, and maintain concentricity of the stator 14.

Mode For The Invention

Another embodiment of the present invention will be described with reference to the attached drawings FIGS. 12 to 14.

FIG. 12 illustrates a longitudinal section of a driving unit in a drum type washing machine in accordance with another preferred embodiment of the present invention, including an annular washer of a shape different from the same in the first embodiment.

That is, the annular washer 30 in accordance with another preferred embodiment of the present invention has fastening bosses 300 projected from a surface of the washer 30 in correspondence to the fastening pass through holes 138 in the rear wall of the rotor. The fastening boss 300 has a fastening hole 300b with a thread. That is, different from the foregoing embodiment, no nut 'N' is required.

At a circumference of the washer 30, there is a bent portion 310 with a shape in conformity with the hub 132.

In the meantime, the plurality of fastening bosses 300 on the annular washer 30 may be formed in at least two lines along a circumferential direction such that imaginary circles of centers of the fastening bosses 300 form diameters different from each other.

It is preferable that the rotor 13 is pressed.

The connector 16 is formed of resin having a vibration mode different from the rotor 13 of steel plate, and also serves as a bushing for the rotor.

Referring to FIG. 12, the connector 16 has fastening pass through holes 162 in a periphery along a circumferential direction in correspondence to the fastening pass through holes 138 in the hub 132 of the rotor 13.

Moreover, the connector 16 has a serration 164 on an inside circumferential surface of the hub 163 in conformity with the serration on the rear end portion of the shaft 4, and reinforcing ribs 161 on an outer side of the hub 163 of the connector 16 for reinforcing strength of the hub 153.

At the time of assembly of the rotor 13 and the connector, the connector is inserted from an inner side to an outer side of the rotor, aligning the fastening pass through holes 138 and 162 of the rotor 13 and the connector 16.

In this state, the annular washer 30 is brought into close contact with an outer side of the hub 132 at the rear wall of the rotor while aligning the fastening holes 300b in the fastening bosses 300 with the fastening pass through holes 138 and 162 of the rotor 13 and the connector 16.

Then, bolts 'B' are passed through the fastening pass through holes 138 and 162 of the rotor 13 and the connector 16, and fastened to the fastening bosses 300 on the washer 30.

Thus, the connector 16 and the rotor 13 are assembled.

The washer 30 in close contact wt the rear wall of the rotor enhances a rigidity of the rotor, to reduce noise from the rotor.

The connector 16, an injection molding of resin, with a vibration mode different from the rotor 13 of steel plate attenuates the vibration from the rotor 13 before transmission of the vibration to the shaft 4.

In the meantime, the engagement of the serration 164 on the inside circumferential surface of the hub 163 of the connector 16 with the serration 400 on the rear end portion of the shaft 4 permits transmission of a rotation force from the rotor 13 to the shaft 4 through the connector 16 as it is.

The reinforcing ribs 161 on the outer side of the hub 163 of the connector 16 reinforce strength of the hub 163.

In the meantime, FIGS. 13 and 14 illustrate perspective views of a connector and a rotor applicable to the embodiment respectively, wherein the connector has, not only the fastening pass through holes 162, but also the positioning projections 160, and the rotor has positioning holes 139 in conformity with the positioning projections on the connector.

That is, between the fastening pass through holes 162 in the connector, there are positioning projections 160 formed as one body with the connector, so that the fastening pass through holes 138 in the rotor 13, the fastening pass through holes 162 in the connector 16, and the fastening bosses 300 on the washer 30 are aligned automatically as the positioning projections 160 are inserted in the positioning holes 139 in the rotor 13, respectively.

In this instance, the positioning projections on the connector in conformity with the positioning holes in the rotor improve workability at the time of assembly of the rotor and the connector.

Of course, it is required that the annular washer 30 has positioning holes (not shown) for inserting the positioning projections 160 on the connector 16, in addition to the fastening pass through holes 300a (see FIGS. 4 and 2D) and the fastening holes 300b (see FIG. 12) in the fastening bosses 300.

In this instance, imaginary center lines connecting the positioning holes, or the positioning projections may have a diameter different from a diameter of an imaginary center line connecting centers of the fastening pass through holes, to form two lines in a circumferential direction in total.

In the meantime, it will be apparent to those skilled in the art that various modifications and variations can be made in the present invention without departing from the spirit or scope of the inventions.

That is, though not shown, of course it is possible that, opposite to FIGS. 4 and 12 illustrating a case the washer 30 is inserted from rear to front of the rotor, the washer 30 can be inserted from front to rear of the rotor. In this case, it will be apparent to those skilled in the art that a slight variation of the annular washer can be accompanied.

Alikely, though not shown, of course it is possible that, opposite to FIGS. 4 and 12 illustrating a case the connector 16 is inserted from rear to front of the rotor, the connector 16 can be inserted from front to rear of the rotor. In this case, it will be apparent to those skilled in the art that a slight variation of the connector can be accompanied.

INDUSTRIAL APPLICABILITY

The direct drive motor in a washing machine of the present invention permits to provide a drum type washing machine having less noise, fault, and power loss, improve Workability at the time of fabrication of the rotor, and reduce vibration from the rotor by means of the washer provided on the inner or outer side of the rear wall of the rotor.

Moreover, the rotor of steel plate enabling pressing with good processability to require a shorter fabrication time period permits to provide a drum type washing machine having an improved productivity, the connector having a vibration mode different from the rotor permits to reduce vibration from the rotor to the shaft, and the supporter supports and maintains concentricity of the stator, effectively.

The invention claimed is:

1. A direct drive motor in a washing machine, comprising:
a stator having a winding portion with coils wound thereon;
a rotor having a sidewall, and a rear wall with a pass through hole at a center, an annular washer in close contact with, and fixedly secured to, an outside of the rear wall of the rotor;
a connector of resin having a vibration mode different from the rotor, fixedly secured to the rear wall of the rotor for supporting a washing shaft; and
coupling means for coupling the connector, the rotor, and the washer together,
wherein the annular washer is located between the outside of the rear wall of the rotor and the connector.

2. The direct drive motor as claimed in claim 1, wherein the rotor is constructed of steel plate by pressing, to form the side wall and the rear wall as one body.

3. The direct drive motor as claimed in claim 1, wherein the rotor has fastening pass through holes around the pass through hole,
the washer has fastening pass through holes on a surface thereof in correspondence to the fastening pass through holes in the rear wall of the rotor,
the connector has fastening pass through holes in correspondence to the fastening pass through holes in the rotor, and
the coupling means includes bolts inserted through the fastening pass through holes, and nuts fastened to threads on the bolts, for holding the connector, rotor, and washer.

4. The direct drive motor as claimed in claim 1, wherein the annular washer further includes positioning holes in which the positioning projections on the connector are placed respectively, separate from the fastening pass through holes.

5. The direct drive motor as claimed in claim 4, wherein the positioning holes are formed along a circumferential direction of an imaginary circle having a diameter different from an imaginary circle connecting centers of the fastening pass through holes in the annular washer.

6. The direct drive motor as claimed in claim 2, wherein the rotor further includes a hub projected from the rear wall toward the washing shaft for reinforcing strength, and providing a seating surface.

7. The direct drive motor as claimed in claim 6, wherein the annular washer includes a bent portion on a circumference having a shape in conformity with a shape of a bent portion of the hub.

8. The direct drive motor as claimed in claim 6, wherein the annular washer is in close contact with, and fixedly secured to an outer side of the rear wall of the rotor, and the connector is mounted on an inner side of the rear wall of the rotor.

9. A direct drive motor in a washing machine comprising:
a stator having a winding portion with coils wound thereon;
a rotor having a sidewall, and a rear wall with a pass through hole at a center, and fastening pass through holes around the pass through hole;
an annular washer in close contact with, and fixedly secured to, an outside of the rear wall of the rotor, the annular washer having fastening bosses projected from a surface thereof in correspondence to fastening pass through holes in the rear wall of the rotor, each of the fastening bosses having a fastening hole with a thread on an inside circumference; and
a connector of resin having a vibration mode different from the rotor, fixedly secured to the rear wall of the rotor with bolts passed through the fastening pass through holes in the rotor, and fastened to the fastening bosses on the annular washer,
wherein the annular washer is located between the outside of the rear wall of the rotor and the connector.

10. The direct drive motor as claimed in claim 9, wherein the rotor is constructed of steel plate by pressing, to form the side wall and the rear wall as one body.

11. The direct drive motor as claimed in claim 10, wherein the fastening bosses on the annular washer are in at least two lines in a circumferential direction as imaginary circles connecting centers of the fastening bosses have diameters different from each other.

12. The direct drive motor as claimed in claim 10, wherein the annular washer further includes positioning holes in which the positioning projections on the connector are placed respectively, separate from the fastening bosses.

13. The direct drive motor as claimed in claim 12, wherein the positioning holes are formed along a circumferential direction of an imaginary circle having a diameter different from an imaginary circle connecting centers of the fastening pass bosses on the annular washer.

14. The direct drive motor as claimed in claim 10, wherein the rotor further includes a hub projected from the rear wall toward a washing shaft for reinforcing strength, and providing a seating surface.

15. The direct drive motor as claimed in claim 14, wherein the annular washer includes a bent portion on a circumference having a shape in conformity with a shape of a bent portion of the hub.

16. The direct drive motor as claimed in claim 14, wherein the annular washer is in close contact with, and fixedly secured to an outer side of the rear wall of the rotor, and the connector is mounted on an inner side of the rear wall of the rotor.

17. A direct drive motor in a washing machine comprising:
a stator having a winding portion with coils wound thereon;
a rotor having a sidewall, and a rear wall with a pass through hole at a center, and fastening pass through holes around the pass through hole;
a connector of resin having a vibration mode different from the rotor, fixedly secured to the rear wall of the rotor for supporting a washing shaft, the connector having fastening pass through holes in correspondence to the fastening pass through holes around the pass through hole;
an annular washer in close contact with, and fixedly secured to, an outer side of the rear wall of the rotor, the annular washer having fastening pass through holes in a surface thereof in correspondence to the fastening pass through holes in the rear wall of the rotor, and positioning holes in which the positioning projections on the connector are inserted; and
coupling means for coupling the connector, the rotor, and the washer,
wherein the annular washer is located between the outside of the rear wall of the rotor and the connector.

18. The direct drive motor as claimed in claim 17, wherein the rotor further includes a hub projected from the rear wall toward the washing shaft for reinforcing strength, and providing a seating surface.

19. The direct drive motor as claimed in claim 18, wherein the positioning holes are formed along a circumferential direction of an imaginary circle having a diameter different from an imaginary circle connecting centers of the fastening pass through holes in the annular washer.

20. The direct drive motor as claimed in claim 19, wherein the annular washer includes a bent portion on a circumference having a shape in conformity with a shape of a bent portion of the hub.

* * * * *